(12) United States Patent
Te Kaat

(10) Patent No.: US 11,815,264 B2
(45) Date of Patent: Nov. 14, 2023

(54) BURNER

(71) Applicant: Kueppers Solutions GmbH, Gelsenkirchen (DE)

(72) Inventor: Jens Te Kaat, Dortmund (DE)

(73) Assignee: Kueppers Solutions GmbH, Gelsenkirchen (DE)

( * ) Notice: Subject to any disclaimer, the term of this patent is extended or adjusted under 35 U.S.C. 154(b) by 0 days.

(21) Appl. No.: 16/621,386

(22) PCT Filed: Jul. 19, 2018

(86) PCT No.: PCT/EP2018/069612
§ 371 (c)(1),
(2) Date: Dec. 11, 2019

(87) PCT Pub. No.: WO2019/016307
PCT Pub. Date: Jan. 24, 2019

(65) Prior Publication Data
US 2020/0166208 A1    May 28, 2020

(30) Foreign Application Priority Data

Jul. 21, 2017    (DE) ............... 10 2017 116 529.0

(51) Int. Cl.
*F23D 14/24*    (2006.01)
*B33Y 80/00*    (2015.01)
(Continued)

(52) U.S. Cl.
CPC .............. *F23D 14/24* (2013.01); *B01F 23/19* (2022.01); *B01F 29/40* (2022.01); *B33Y 80/00* (2014.12);
(Continued)

(58) Field of Classification Search
CPC ....................................................... F23D 14/24
See application file for complete search history.

(56) References Cited

U.S. PATENT DOCUMENTS 5,408,830 A    4/1995  Lovett
6,652,268 B1   11/2003 Irwin et al.
(Continued)

FOREIGN PATENT DOCUMENTS

CN    106907710 A    6/2017
DE      9208993 U1   9/1992
(Continued)

OTHER PUBLICATIONS

International Search Report in PCT/EP2018/069612, dated Oct. 29, 2018.
(Continued)

*Primary Examiner* — Jason Lau
(74) *Attorney, Agent, or Firm* — Collard & Roe, P.C.

(57) ABSTRACT

A burner has a housing on which a combustion tube is arranged, wherein the combustion tube has an opening at the end averted from the housing, wherein a mixing element is provided in the combustion tube, and the space between the mixing element and the opening forms a combustion chamber, wherein the housing has at least two mutually separate channels which open out in the mixing element, wherein gases flow through the channels and the mixing element, and mixing of the gases takes place for the first time in a combustion chamber, wherein the mixing element is produced in an additive manufacturing process and has at least two separate intermediate channels which branch in the direction of the combustion chamber in a flow direction.

7 Claims, 10 Drawing Sheets

(51) Int. Cl.
    *F23D 14/62*     (2006.01)
    *F23D 14/66*     (2006.01)
    *F23N 5/08*     (2006.01)
    *B01F 23/10*     (2022.01)
    *B01F 29/00*     (2022.01)
    *B01F 101/00*     (2022.01)

(52) U.S. Cl.
    CPC ............ *F23D 14/62* (2013.01); *F23D 14/66* (2013.01); *F23N 5/08* (2013.01); *B01F 2101/503* (2022.01); *F23D 2208/10* (2013.01); *F23D 2213/00* (2013.01); *F23D 2900/00003* (2013.01)

(56) References Cited

U.S. PATENT DOCUMENTS

| | | | | |
|---|---|---|---|---|
| 2001/0018173 | A1* | 8/2001 | Tiemann | F23D 17/002 |
| | | | | 431/284 |
| 2012/0052454 | A1* | 3/2012 | Roy | F23N 5/242 |
| | | | | 431/74 |
| 2015/0300634 | A1* | 10/2015 | Kiener | F23D 14/78 |
| | | | | 431/183 |
| 2016/0223201 | A1 | 8/2016 | Zink | |
| 2016/0348904 | A1* | 12/2016 | Gangoli | F27D 99/0033 |
| 2016/0377293 | A1 | 12/2016 | Short et al. | |
| 2017/0234542 | A1* | 8/2017 | Barve | F23L 7/00 |
| | | | | 60/746 |

FOREIGN PATENT DOCUMENTS

| | | | | |
|---|---|---|---|---|
| DE | 69818909 | T2 | 8/2004 | |
| EP | 0 884 528 | B1 | 10/2003 | |
| EP | 2362139 | A1 * | 8/2011 | F23C 9/006 |
| GB | 2 536 965 | A | 10/2016 | |

OTHER PUBLICATIONS

Letter to WIPO from German Patent Attorney in PCT/EP2018/069612, dated Dec. 21, 2018.

* cited by examiner

BURNER

CROSS REFERENCE TO RELATED APPLICATIONS

This application is the National Stage of PCT/EP2018/069612 filed on Jul. 19, 2018, which claims priority under 35 U.S.C. § 119 of German Application No. 10 2017 116 529.0 filed on Jul. 21, 2017, the disclosure of which is incorporated by reference. The international application under PCT article 21(2) was not published in English.

BACKGROUND OF THE INVENTION

1. Field of the Invention

The invention relates to a burner having a housing on which a combustion tube is disposed, wherein the combustion tube has an aperture at the end turned away from the housing, wherein a mixing element is provided in the combustion tube and the space between this mixing element and the aperture forms a combustion chamber, wherein the housing has at least two ducts that are separated from one another and open in the mixing element, wherein gases flow through the ducts and the mixing element and a mixing of these gases first takes place in the combustion chamber.

2. Description of the Related Art

Such burners, especially gas burners for industrial use are devices that transform chemical energy to thermal energy in a combustion process. In this combustion process, at least one oxidant, preferably air or oxygen, is consumed together with a fuel in a continuous heat-releasing reaction in the combustion chamber. The heated exhaust gases are discharged via the aperture into the open environment and may be used, for example, in drying systems, thermal post-combustion facilities, circulation systems, curing ovens or other process-engineering systems. All commercial, purified gases such as city gas, grid gas, natural gas and liquefied gas as well as their mixtures are examples of fuels that may be fired together with air.

The burners generally known from the prior art can be divided into two categories, wherein the first category includes burners in which the oxidant is injected as a mixture together with the fuel into the combustion chamber. Such burners are also known as premix burners. In contrast to the burners of the first category, the burners included in the second category have separate supply lines for the oxidant and fuel to the combustion chamber, and so mixing of the two substances first takes place in the combustion chamber.

The burners of the first category indeed have the advantage that the mixture of oxidant and fuel is available in a homogeneous condition in the combustion chamber, but they also have the disadvantage that an absolute safety against flashbacks is not possible. In burners of the second category, flashbacks are precluded by the separate feed of the oxidant and of the fuel, but the homogeneity of the mixture in the combustion chamber is not optimal compared with the homogeneity achieved by the mixture of a burner of the first category.

From both US 2016/0377293 A1 and US 2016/0223201 A1 as well as from GB 2 536 965 A, additive fabrication processes for the manufacture of structural parts for burners are known, since this is appropriate precisely for complexly configured structural parts.

SUMMARY OF THE INVENTION

The invention relates to a burner of the second category and, in view of the above-described range of constraints between safety and optimum combustion due to a high degree of homogeneity of the mixture, has set itself the task of specifying a burner of the second category, which achieves an improved homogeneity of the mixture in the combustion chamber, in order to optimize the combustion process.

This task is accomplished by a burner of the type designated in the introduction and having the features according to the invention.

Thus a burner is made available in which the mixing element is manufactured with an additive fabrication process. The additive fabrication processes also include, among others, powder-bed processes, especially the selective laser melting as well as the selective laser sintering. Due to the fabrication of the mixing element with an additive fabrication process, a new type of feed of the oxidant and of the fuel into the combustion chamber can be achieved, which is optimizable to the effect that a homogeneous mixing is achievable over a broad regulation range of the ratio of oxidant to fuel and hereby a complete combustion over the entire power range of the burner is assured.

This mixing element has at least two separate intermediate ducts, which branch in flow direction in the direction of the combustion chamber. Intermediate ducts that branch and then open out are indeed known from US 2016/0223201 A1, but that publication relates not to any gas burner but instead to a fuel injector for a gas-turbine engine. It involves a fuel injector, which is to be compared with gas burners of the first category, in which the oxidant is injected together with the fuel as a mixture into the combustion chamber (a so-called premix burner).

The invention, however, relates to a burner of the second category, in which the separate supply of the oxidant as well as of the fuel takes place via two ducts up to the combustion chamber. US 2016/0223201 A1, however, has only one main feed duct, as is clearly apparent from FIG. 2. On this there is disposed a node, from which two subordinate lines (not separated from one another) branch off inside the turbine.

A problem not to be underestimated during operation of a burner is the formation of harmful nitrogen oxides, which may form during the combustion process. In this context, the configuration of the burner, especially of the combustion chamber, and the feed of the oxidant and of the fuel, have a considerable influence on the formation of the nitrogen oxide during the combustion process. An additively fabricated mixing element may be optimized to the effect that the formation of such nitrogen oxides is either suppressed completely or reduced to a minimum. In this connection, it is conceivable that the burner provides an exhaust-gas return, in which the already burned exhaust gases having a low oxygen content and a relatively high carbon dioxide content are introduced into the combustion chamber. The injection of such inert exhaust gases leads to a distinct reduction of the formation of the nitrogen oxides.

Furthermore, a configuration of the burner and/or mixing element is also conceivable to the effect that the exhaust-gas return provides a preheating of the oxidant and/or fuel being fed into the combustion chamber.

Further configurations of the invention will become apparent from the dependent claims.

In this connection, it is expedient for the mixing element to be constructed in one piece. A one-piece mixing element has the advantage that the feed of the oxidant and of the fuel into the combustion chamber can be optimized with a compact dimension of the mixing element. Moreover, the feed of the oxidant and of the fuel can be provided in a way that is not realizable with a multi-piece mixing element. At the same time, the invention provides that the mixing element has at least two separate intermediate ducts, which branch in flow direction in the direction of the combustion chamber. The branching of the intermediate ducts ensures that the oxidant and/or the fuel are injected not only locally at one point into the combustion chamber but instead at a multiplicity of possible positions, so that a largely homogeneous mixing of the oxidant and of the fuel already takes place in the initial region of the combustion chamber. The said initial region of the combustion chamber is to be regarded as the region that has a shorter distance to the mixing element than to the aperture of the burner. The homogeneous mixing of the oxidant and of the fuel not only suppresses the formation of nitrogen oxides but also increases the efficiency of the burner and thus reduces the fuel costs.

Furthermore, it is preferably provided that three to five intermediate ducts are provided. This choice represents an optimum between the complexity of the construction of the mixing element and its fabrication-related requirements as well as the advantages to be achieved in terms of an optimum combustion.

In a further embodiment, it is provided that the intermediate ducts open in a multiplicity of outlet apertures, wherein, in at least one intermediate duct, the outlet cross section is reduced compared with the duct cross section. The reduction of the outlet cross section offers the advantage that, on the side of the mixing element turned toward the combustion chamber, a multiplicity of outlet apertures can be provided that permit an optimum mixing of the oxidant and of the fuel. On the other hand, it is further possible to feed a high volume flow of gases to the mixing elements, since the ducts leading to the mixing elements have a relatively large diameter.

Furthermore, it is provided that each individual outlet aperture is equipped with suitable mixing, swirling and/or atomizing elements for the gases at the outlet from the mixing element. The gases are turbulently swirled by these elements at the outlet, so that the oxidant can be mixed particularly homogeneously with the fuel. It is advantageous in this context that the homogeneity of the mixing of the oxidant and of the fuel is already available at the inlet into the initial region of the combustion chamber.

A further configuration provides that swirl elements, baffle elements, flow-separating edges, stagnation edges, grooves, mixing nozzles, mixing valves and/or outlet elbows are provided. By this, it is to be understood not that all outlet apertures have the same elements but instead that, depending on position of the outlet aperture, one of the aforesaid elements that leads on the whole to an improved homogeneity of the mixing is provided. This permits a diverse combination of the most diverse elements, so that the mixing element can be adapted to the requirements of particular burner classes.

A special configuration of the invention provides that at least one of the intermediate ducts has helical grooves. In this case, it is possible, for example, that the respective groove has a rectangular cross section or is even diamond shaped. By the introduction of helical grooves into the intermediate ducts, the inlet velocity of the respective gases into the combustion chamber can be controlled, in order to achieve mixing of the oxidant and of the fuel with a high degree of homogeneity.

A further particular configuration of the invention provides that the outlet apertures are disposed in such a way that the gases achieve a homogeneous mixing in the combustion chamber. Thereby the efficiency of the burner is increased and simultaneously the formation of harmful nitrogen oxides is suppressed. The feed of the oxidant and of the fuel can take place via several ducts, wherein, depending on the power range, individual feeds, for example, are blocked or opened in the region of the housing of the burner. Hereby a complete combustion can be achieved over the entire power range of a burner.

Moreover, it is preferably provided that a UV or IR flame sensor is provided on the outlet side of the mixing element. Hereby the combustion process can be monitored continuously, in order to adapt the feed of oxidant and/or fuel in such a way if necessary that the combustion process proceeds according to the desired criteria. For this purpose, the flame sensor may be combined with a suitable control or regulating unit using information technology, wherein this control or regulating unit may be provided, for example, in the housing of the burner.

In addition, it is provided that exhaust gas is able to flow back from the combustion chamber in the direction of the housing through one or more of the intermediate ducts. In particular, via the wall of the intermediate ducts, the returning exhaust gas is able to preheat the gases flowing inward in the direction of the combustion chamber. Since the cold combustion air flows around the ducts conveying the hot exhaust gas, the combustion air is preheated in the process. This increases the efficiency of the burner in the sense of a recuperative burner, wherein the special advantages of the heat-exchanger manufactured by 3D printing are fully manifested. Hereby a very compact heat exchanger with good efficiency is obtained inside the mixing unit.

BRIEF DESCRIPTION OF THE DRAWINGS

Further features, details and advantages of the invention will become apparent on the basis of the following description hereinafter as well as on the basis of the drawings. Items or elements corresponding to one another are denoted by the same reference symbol in all figures, wherein.

DETAILED DESCRIPTION OF THE PREFERRED EMBODIMENTS

Figure 1:
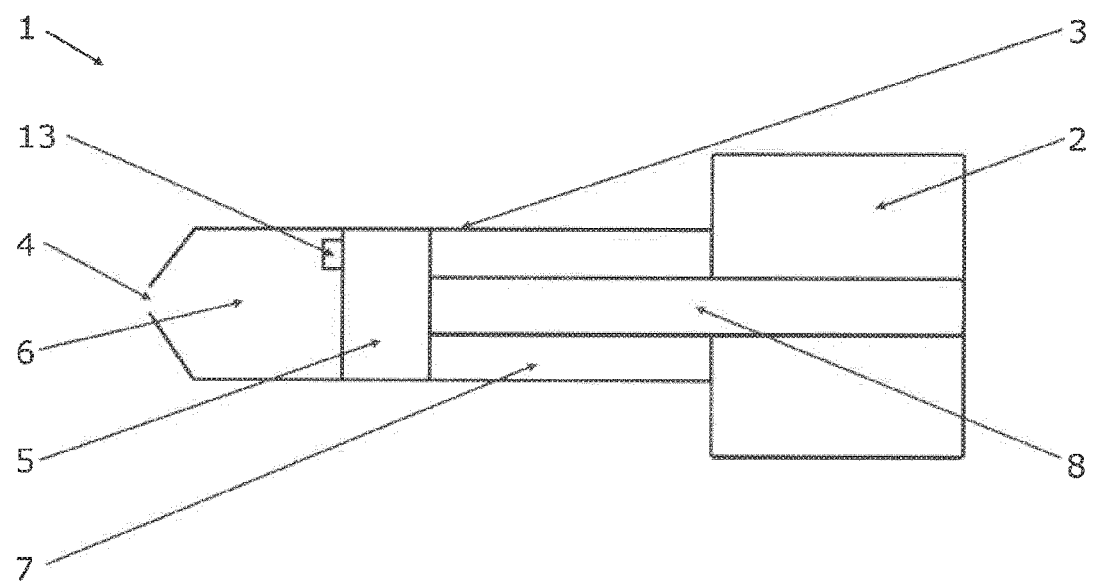
FIG. 1 shows a schematic diagram of a burner according to the invention.

In FIG. 1, a schematic diagram is shown of a burner according to the invention, which has a housing 2, on which a combustion tube 3 is disposed, wherein the combustion tube 3 has an aperture 4 at the end turned away from the housing 2. A mixing element 5 is provided in the combustion tube 3, and the space between this mixing element 5 and the aperture 4 forms a combustion chamber 6. In this exemplary embodiment, a first duct 8 extends at least partly through the housing 2 and the combustion tube 3. The spatial volume or the intermediate chamber 7 between the combustion tube 3 and the first duct 8 forms a further duct.

Thus the housing 2 has, separated from one another, at least two ducts 8, which open in the mixing element 5, wherein gases propagate or flow through the ducts 8 and the mixing element 5, and a mixing of these gases first takes place in the combustion chamber 6. For reasons of clarity, the connection between the housing 2 and the duct formed by the intermediate chamber 7 is not illustrated. In the combustion chamber 6, a UV or IR flame sensor is provided on the outlet side of the mixing element 5, in order to monitor the combustion process continuously. What is not illustrated is an igniter, which ignites the gas mixture in the fuel chamber 6.

Figure 2:
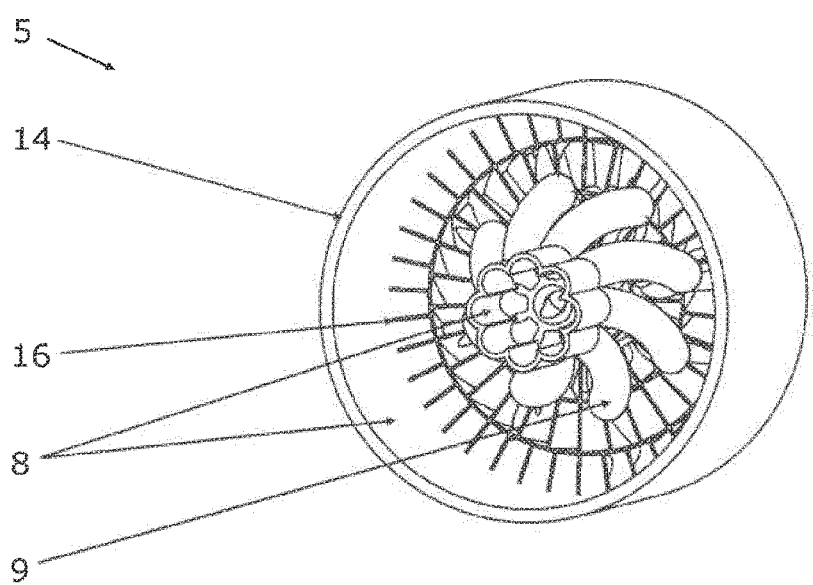
FIG. 2 shows a perspective view of a mixing element according to the invention, which is designed as a two-duct system.
Figure 3:
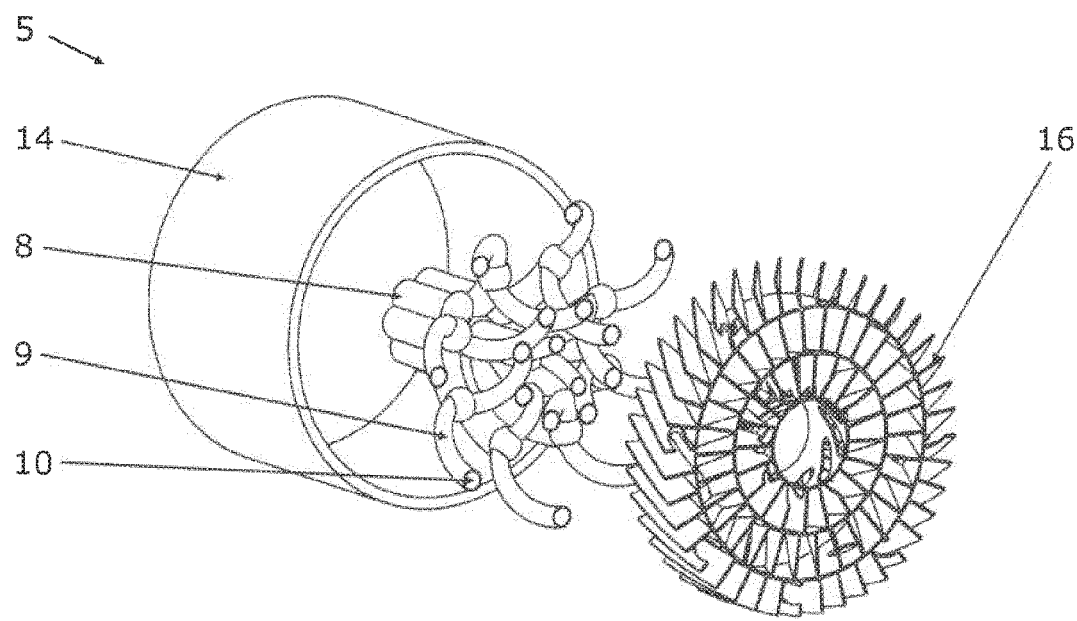
FIG. 3 shows an imaginary exploded diagram of the mixing element from FIG. 2.
Figure 4:
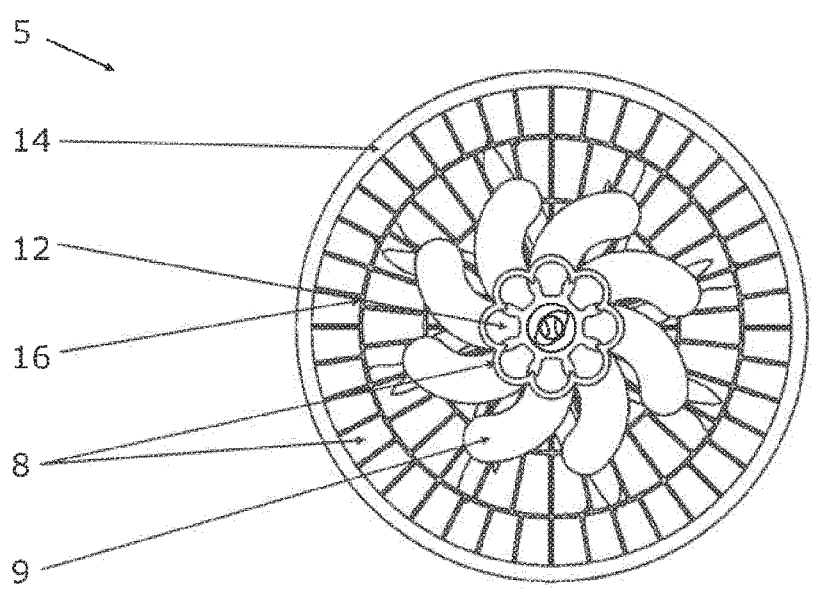
FIG. 4 shows an inlet-side view of the mixing element from FIG. 2.
Figure 5:
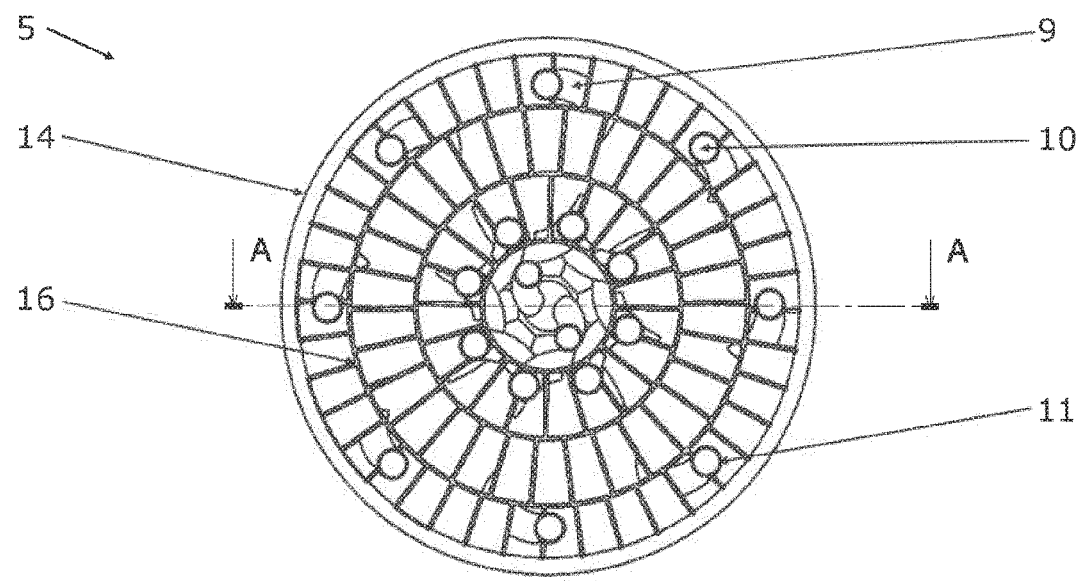
FIG. 5 shows an outlet-side view of the mixing element from FIG. 2.
Figure 6:
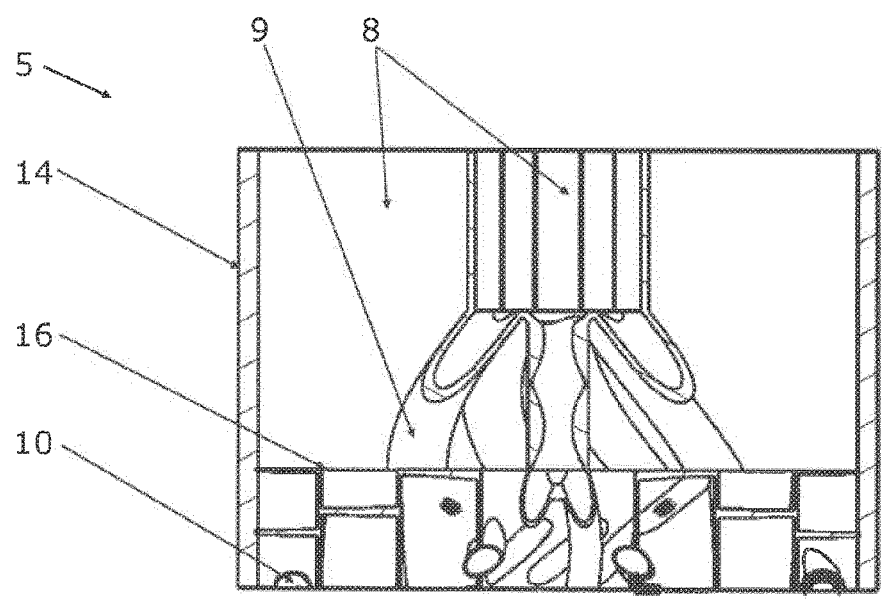
FIG. 6 shows a sectional diagram of the mixing element from FIG. 2 along the line A-A.

The mixing element 5, which is designed as a two-duct system, is shown in FIG. 2 in a perspective view, in FIG. 3 in an imaginary exploded diagram, in FIG. 4 on the inlet side and in FIG. 5 on the outlet side, and also in FIG. 6 as a sectional diagram. The imaginary exploded diagram in FIG. 3 provides merely an overview, and separation of the various components of the mixing element 5 is actually not possible, because it would lead to a destruction of the mixing element 5, since the mixing element 5 is formed in one piece by means of an additive fabrication process. The inlet side is to be understood as that side of the mixing element 5 that in the installed condition in the burner 1 adjoins the intermediate chamber 7. The outlet side is to be understood as that side of the mixing element 5 that in the installed condition in the burner 1 adjoins the combustion chamber 6.

The mixing element 5 preferably has a tubular outer wall 14, which is equipped with radially inwardly projecting flow-resistance elements 16, wherein the flow-resistance elements 16 are preferably aligned transversely relative to the longitudinal axis of symmetry or axis of rotation of the outer wall 14. The flow-resistance elements 16 may be separated in radial direction by tube portions, which have a smaller diameter and a shorter longitudinal extent than the outer wall 14. Hereby it is possible that the flow-resistance elements 16, depending on their radial position, are disposed at various angles transverse relative to the longitudinal axis of symmetry of the outer wall 14. Preferably, the flow-resistance elements 16 may be designed in the manner of paddle wheels.

The inner or first duct 8, through which preferably the gaseous fuel is conveyed, is branched into a multiplicity of intermediate ducts 9, which pass through the flow-resistance elements 16 and their associated tube portions. The intermediate ducts 9 have outlet apertures 10, which open in the combustion chamber 6. For the sake of clarity, possible swirl elements, baffle elements, flow-separating edges, stagnation edges, grooves, mixing nozzles, mixing valves and/or outlet elbows at the outlet apertures 10 are not illustrated. The second duct 8 or the intermediate chamber 7 for the oxidant is formed by the space bounded by the outer wall 14 and the duct 8 as well as its intermediate ducts 9. What is advantageous in this exemplary embodiment is that the intermediate ducts 9 themselves represent additional flow-resistance elements. Thus the intermediate ducts 9 have not only the function of transporting the fuel into the combustion chamber but also that of contributing to swirling of the oxidant. In this embodiment, the duct cross section 12 of the first duct 8 is made larger than the cross section of the outlet apertures 10, in order to achieve a uniform distribution of the fuel.

Figure 7:
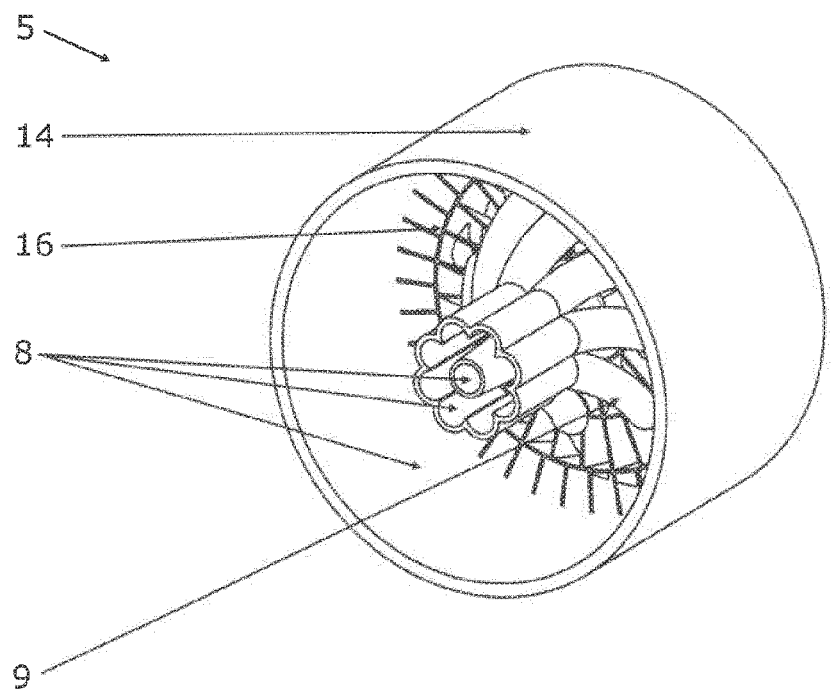
FIG. 7 shows a perspective view of a mixing element according to the invention, which is designed as a three-duct system.
Figure 8:
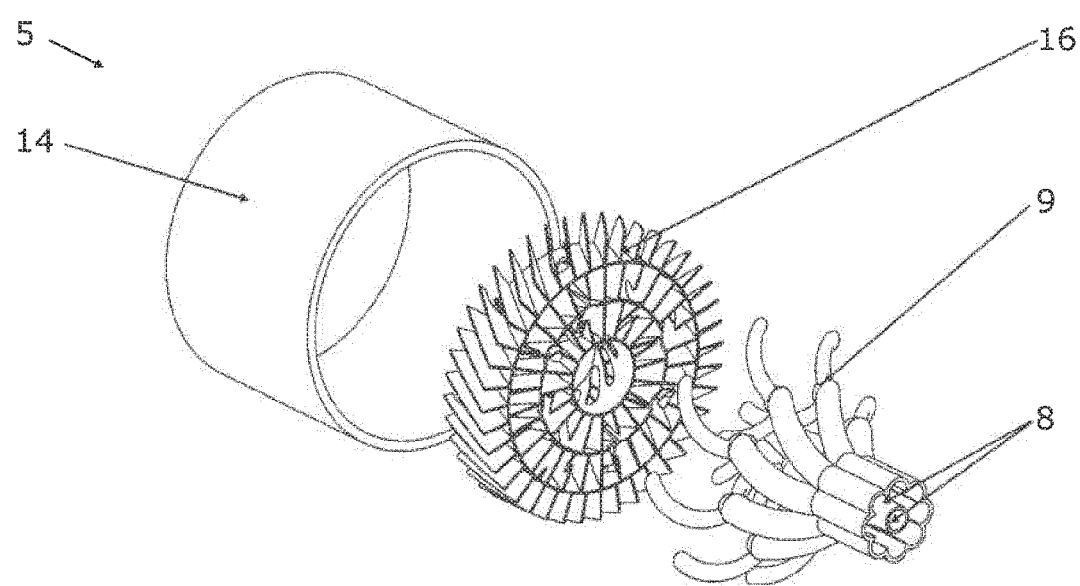
FIG. 8 shows an imaginary exploded diagram of the mixing element from FIG. 7.
Figure 9:
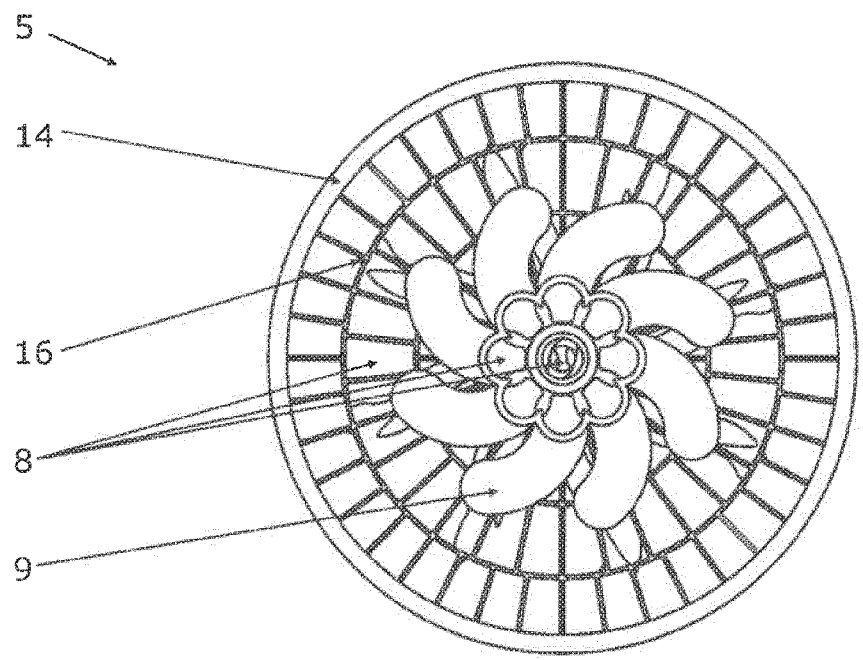
FIG. 9 shows an inlet-side view of the mixing element from FIG. 7.
Figure 10:
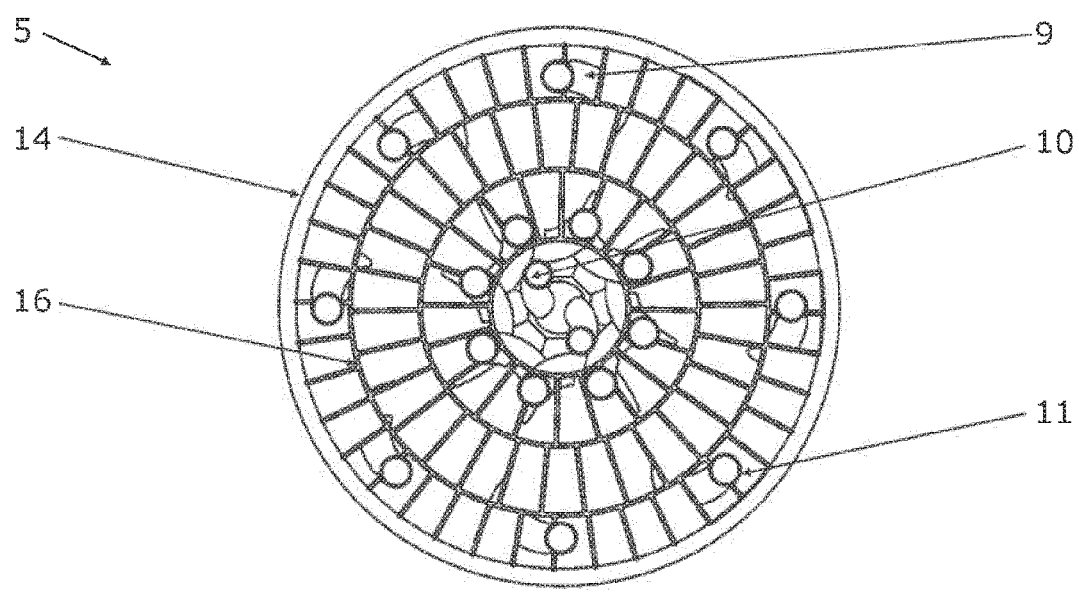
FIG. 10 shows an outlet-side view of the mixing element from FIG. 7.

A further mixing element 5, which is designed as a three-duct system, is shown in FIG. 7 in a perspective view, in FIG. 8 in an imaginary exploded diagram, in FIG. 9 on the inlet side and in FIG. 10 on the outlet side. The imaginary exploded diagram in FIG. 8 provides merely an overview, and separation of the various components of the mixing element 5 is actually not possible.

In contrast to the two-duct system, the three-duct system has an additional duct 8, which is disposed here, for example, in the first duct 8. This additional duct 8 in turn has is own intermediate ducts 9, which pass through the flow-resistance elements 16 and their associated tube portions. This additional duct 8 may be used, for example, to inject additional fuel into the combustion chamber 6 and thereby to optimize the combustion process.

Figure 11:
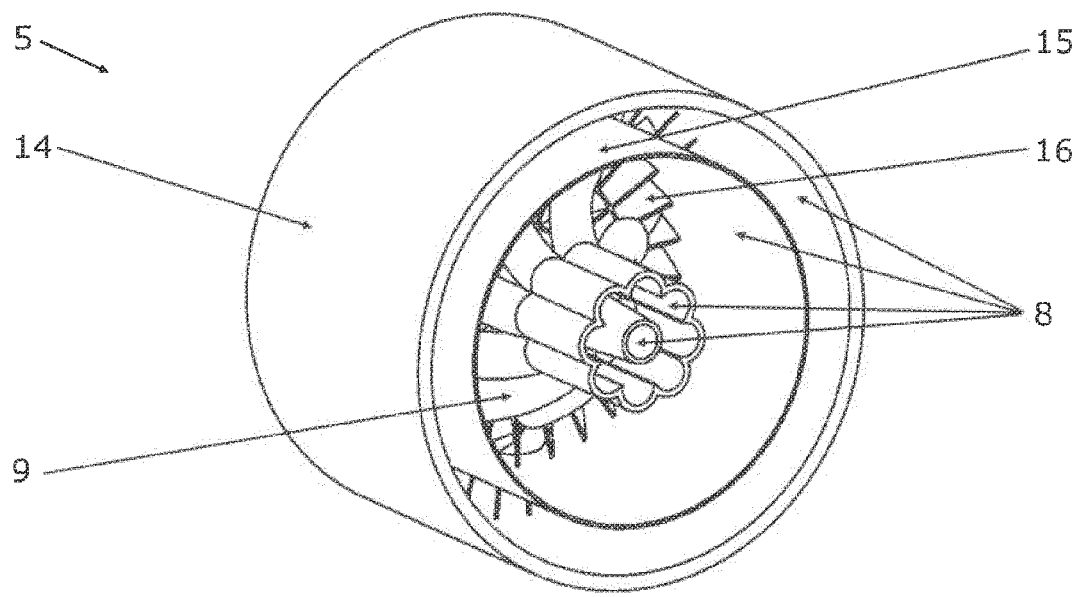
FIG. 11 shows a perspective view of a mixing element according to the invention, which is designed as a four-duct system.
Figure 12:
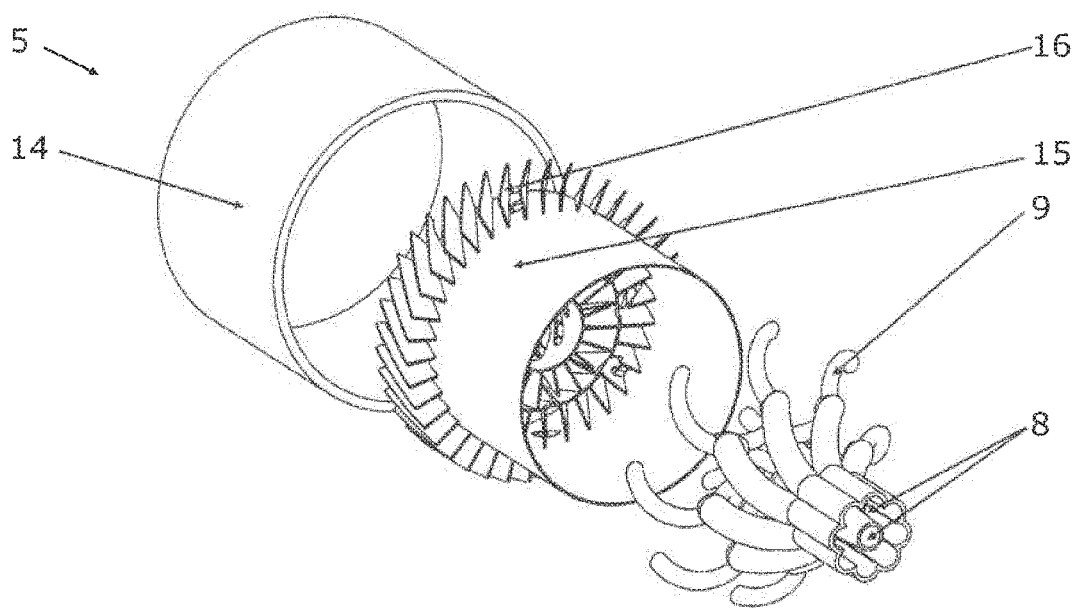
FIG. 12 shows an imaginary exploded diagram of the mixing element from FIG. 11.
Figure 13:
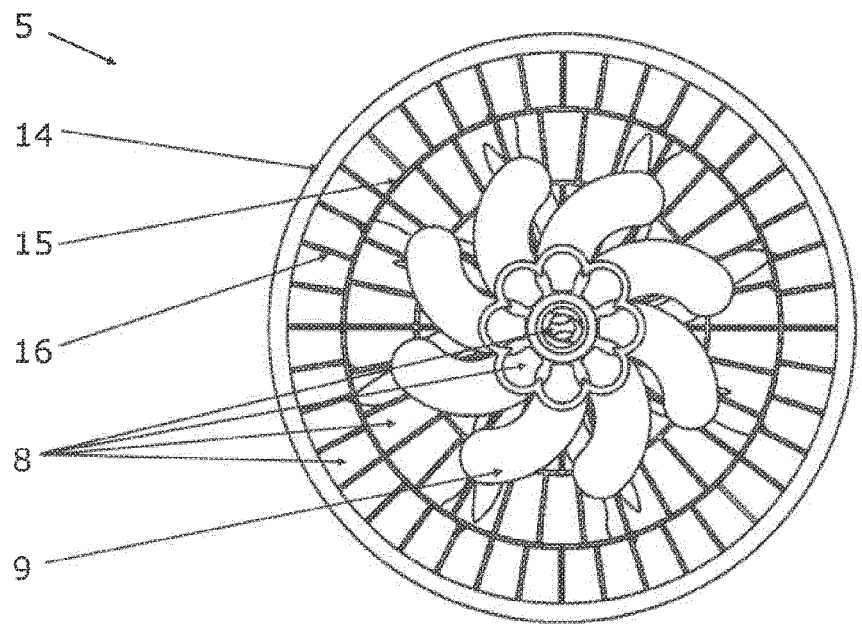
FIG. 13 shows an inlet-side view of the mixing element from FIG. 11.
Figure 14:
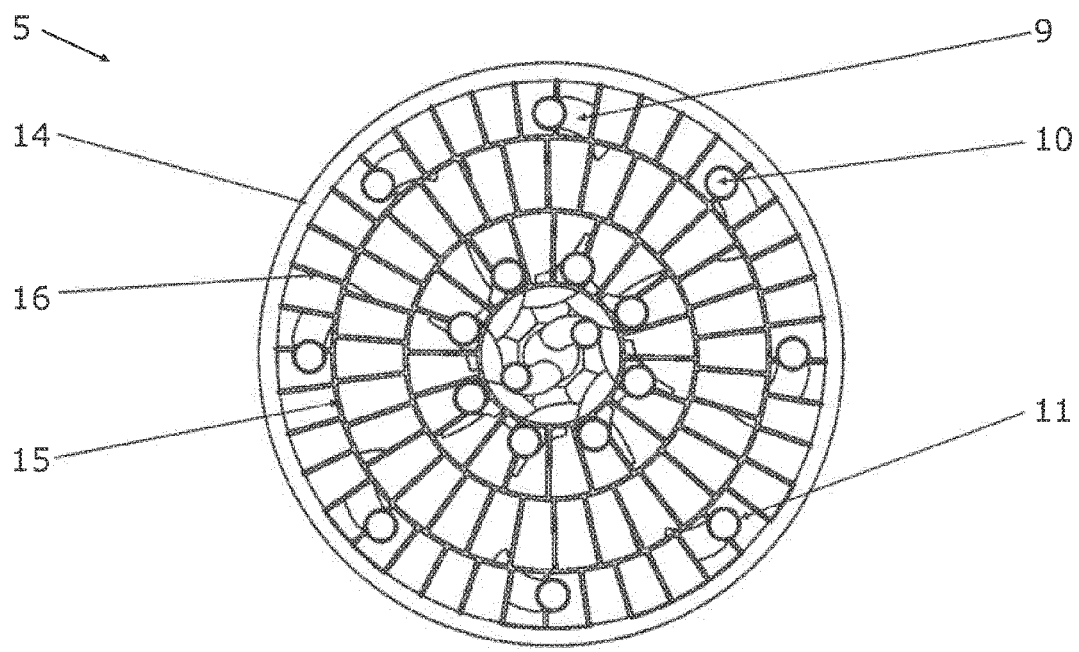
FIG. 14 shows an outlet-side view of the mixing element from FIG. 11.

A special mixing element 5, which is designed as a four-duct system, is shown in FIG. 11 in a perspective view, in FIG. 12 in an imaginary exploded diagram, in FIG. 13 on the inlet side and in FIG. 14 on the outlet side. The imaginary exploded diagram in FIG. 12 provides merely an overview, and separation of the various components of the mixing element 5 is actually not possible.

In contrast to the three-duct system, the four-duct system has a tubular intermediate wall 15, which has a smaller diameter than the outer wall 14 but a substantially identical longitudinal extent.

Figure 15:
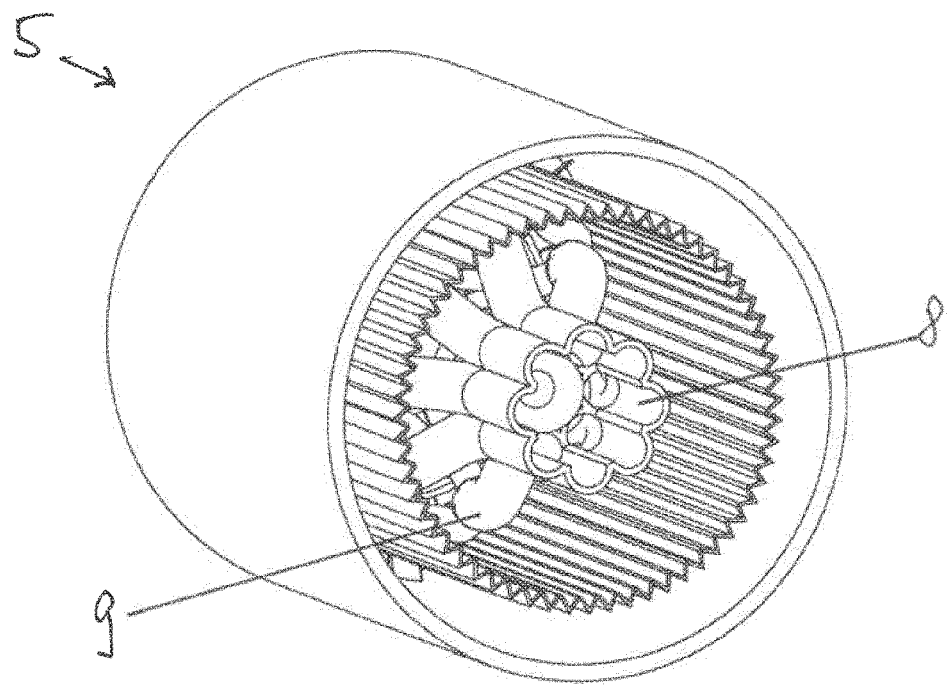
FIG. 15 shows a perspective view of a mixing element according to the invention.
Figure 16:
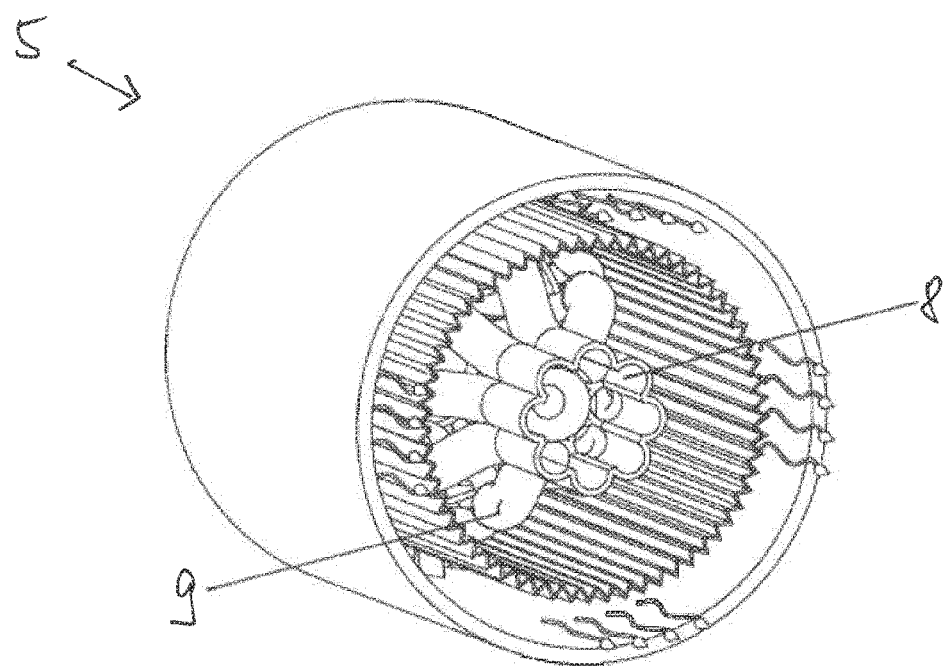
FIG. 16 shows a variant of FIG. 15 with indicated gas arrows.
Figure 17:
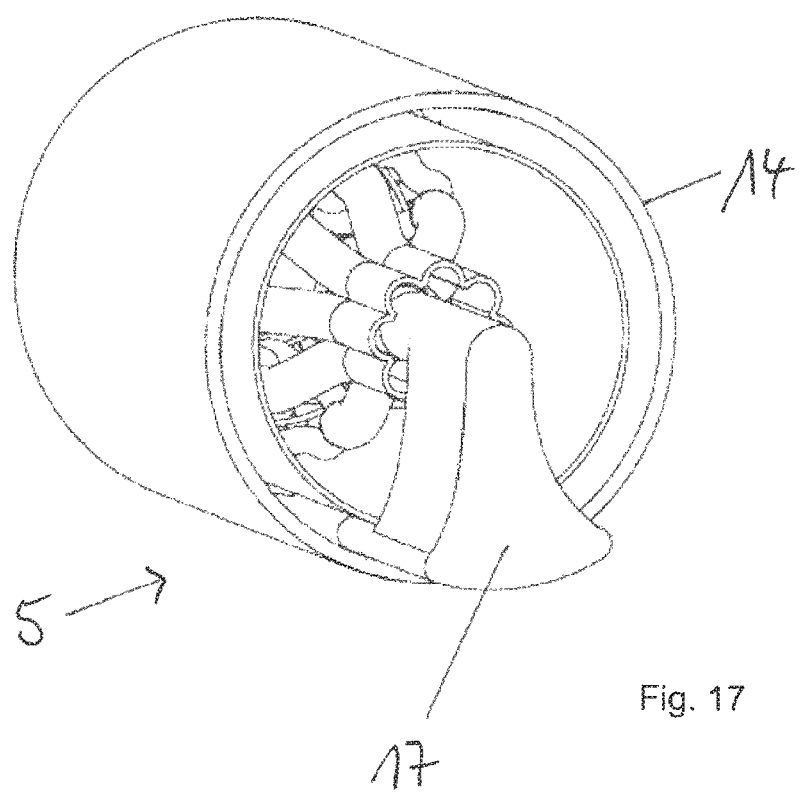
FIG. 17 shows an inlet-side view of the mixing element having a recirculatory.

As follows in particular from FIGS. 15 and 16, the combustion air is able to flow through the inner ducts 8 into the combustion chamber 6 and to flow out again through one of the outer ducts 8. In order to change the flow direction and to feed the inwardly flowing exhaust gas to the combustion air again, a recirculator 17 is provided (FIG. 17).

Figure 18:
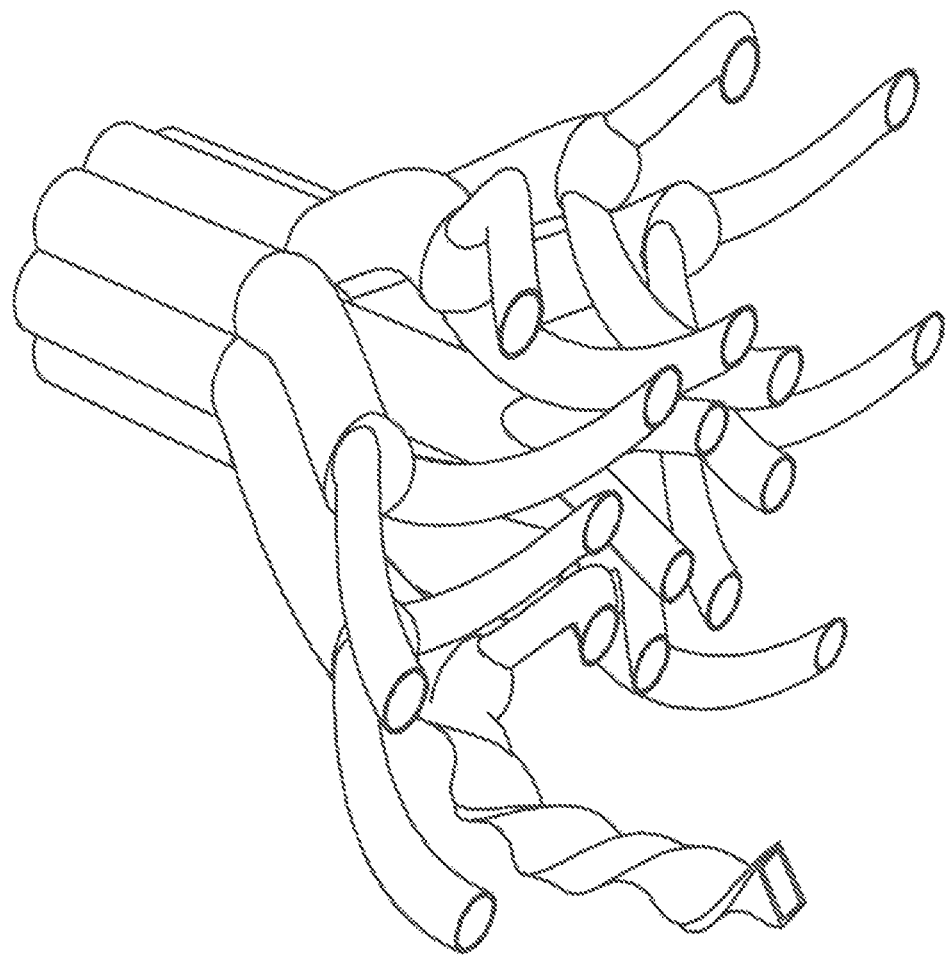
FIG. 18 shows a portion of a mixing element in which at least one of the intermediate ducts has helical grooves.

A special configuration of the invention provides that at least one of the intermediate ducts has helical grooves as shown in FIG. 18. In this case, it is possible, for example, that the respective groove has a rectangular cross section or is even diamond shaped. By the introduction of helical grooves into the intermediate ducts, the inlet velocity of the respective gases into the combustion chamber can be controlled, in order to achieve mixing of the oxidant and of the fuel with a high degree of homogeneity.

Naturally the invention is not limited to the illustrated exemplary embodiments. Further configurations are possible without departing from the basic ideas. It is selfevident that the feed of the oxidant and of the fuel for a burner having a mixing element designed as a three-duct system or four-duct system must be appropriately adapted. Furthermore, the number of ducts is not limited to the exemplary embodiments illustrated above by way of example. Depending on requirements and field of use of the burner, even more ducts may be practical.

LIST OF REFERENCE SYMBOLS

1 Burner
2 Housing
3 Combustion tube
4 Aperture
5 Mixing element
6 Combustion chamber
7 Intermediate chamber
8 Duct
9 Intermediate duct
10 Outlet aperture
11 Outlet cross section
12 Duct cross section
13 UV or IR flame sensor
14 Outer wall
15 Intermediate wall
16 Flow-resistance element
17 Recirculator

The invention claimed is:

1. A burner having a housing on which a combustion tube is disposed,
   wherein the combustion tube has an aperture at the end turned away from the housing,
   wherein a mixing element is provided in the combustion tube and the space between this mixing element and the aperture forms a combustion chamber,
   wherein the housing has at least first, second, and third channels that are separated from one another and open into the mixing element,
   wherein gases flow through the first, second, and third channels and the mixing element,
   wherein the first channel is configured to receive a first gaseous fuel and the third channel is configured to receive a second gaseous fuel,
   wherein at least the first channel or the third channel has at least two intermediate channels branching toward the combustion chamber in flow direction and opening into a plurality of outlet openings,
   wherein exhaust gas is able to flow back from the combustion chamber in the direction of the housing through one or more of the intermediate channels, and
   wherein the exhaust gas flowing back from the combustion chamber gives up heat via the wall of the intermediate channels to the gases flowing inward in the direction of the combustion chamber.

2. The burner according to claim 1, wherein the mixing element is constructed in one piece.

3. The burner according to claim 1, wherein three to five intermediate channels are provided in the first and third channels.

4. The burner according to claim 1, wherein at least one of the intermediate channels has helical grooves.

5. The burner according to claim 1,
   wherein each intermediate channel of the first channel has an outlet cross-section reduced compared with the channel cross-section of the first channel,
   wherein the outlet openings are disposed in such a way that the gases achieve a homogeneous mixing in the combustion chamber due to the plurality of outlet openings having reduced outlet cross-sections compared with the channel cross-section of the first channel.

6. The burner according to claim 1, wherein a UV or IR flame sensor is provided on the outlet side of the mixing element.

7. The burner according to claim 1, wherein the first channel is disposed in the second channel and the third channel is disposed in the first channel.

* * * * *